W. L. BELL.
UNIVERSAL SHAFT.
APPLICATION FILED NOV. 20, 1919.
1,390,484.
Patented Sept. 13, 1921.
2 SHEETS—SHEET 2.
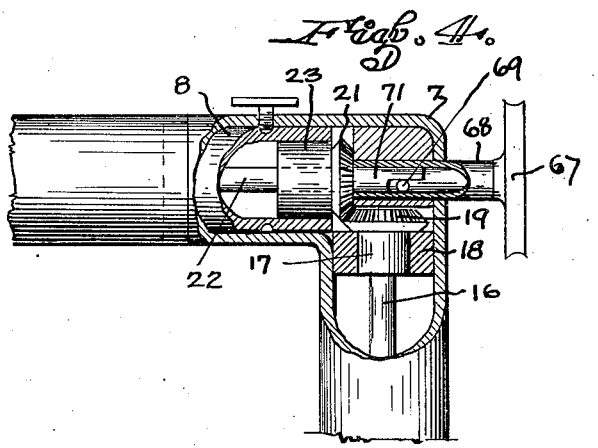
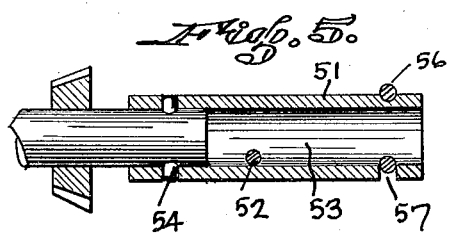
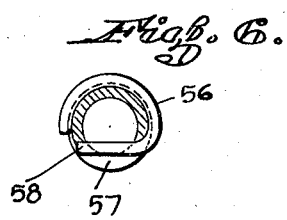
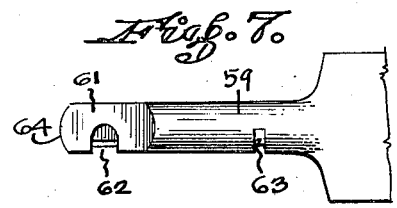
WITNESS
INVENTOR
William L. Bell
BY
ATTORNEY

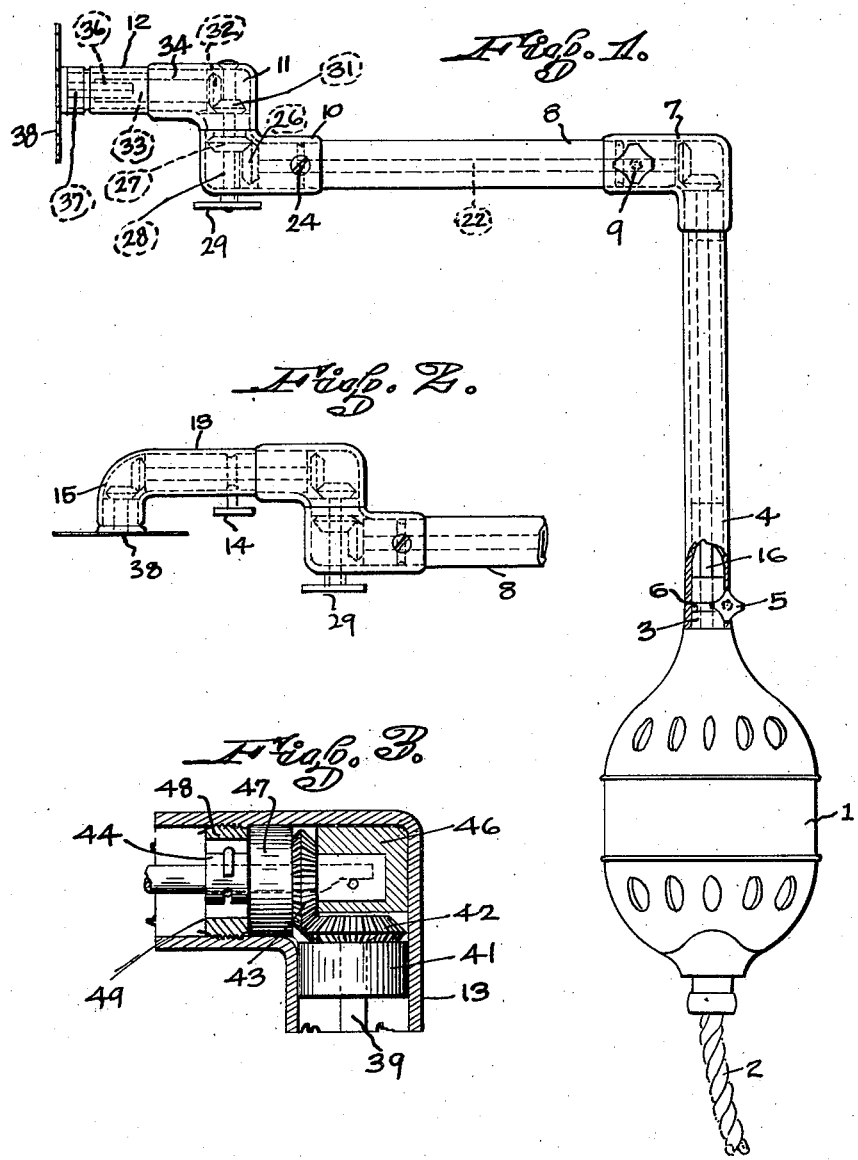

UNITED STATES PATENT OFFICE.

WILLIAM L. BELL, OF OAKLAND, CALIFORNIA.

UNIVERSAL SHAFT.

1,390,484.  Specification of Letters Patent.  Patented Sept. 13, 1921.

Application filed November 20, 1919. Serial No. 339,503.

*To all whom it may concern:*

Be it known that I, WILLIAM L. BELL, a citizen of the United States, and a resident of the city of Oakland, county of Alameda, State of California, have made a new and useful invention, to wit, Improvements in Universal Shafts; and I do hereby declare the following to be a full, clear, concise, and exact description of the same.

Among the objects of the invention is to produce a shaft for the transmission of power, adapted to be swiveled to accomplish universal movement, without serious reduction of efficiency in transmission.

Another object is to construct and arrange the shaft in such a manner that it may easily and quickly be assembled and disassembled, for the purpose of sterilization, when adapted for use in connection with surgical operations. The present adaptation of the invention is disclosed in its application to surgery; but it is equally applicable to mechanical operations in wood and metal, such as drilling, sawing and engraving when suitably constructed. I further contemplate the construction of mechanical tools within the purview of this invention in connection with drills, screw drivers, socket wrenches and the like, for use in reaching screws, nuts and other parts in inaccessible locations, in automobiles and other mechanisms. Other objects and advantages will appear as this description progresses.

In this specification and the annexed drawings, the invention is illustrated in the form considered to be the best but it is to be understood that the invention is not limited to such form because it may be embodied in other forms, and it is also to be understood that in and by the claims following the description it is desired to cover the invention in whatever form it may be embodied.

In the accompanying two sheets of drawings,

Figure 1 is a side elevation of the surgical adaptation of this invention connected with an electric motor.

Fig. 2 is a fragmentary detail of the swivel nose showing the manner of changing the plane of operation of the working tool.

Fig. 3 is an enlarged fragmentary detail partially in cross section of the elbow gearing.

Fig. 4 is a similar view of a modification of the elbow gearing, for the application of a handle for manual operation.

Fig. 5 is a similar view of the clutch.

Fig. 6 is an end view of the same.

Fig. 7 is an enlarged detail in plan of a bit shank.

Fig. 8 is a side elevation of the same.

In detail the construction illustrated in the drawings includes the electric motor 1 connected to the source of power through the flexible cable 2. The case of the motor terminates in a cylindrical plug 3, adapted to snugly fit within the end of the tube 4. This tube has the set screw 5 threaded therein with a rounded end adapted to set within the annular groove 6 in the plug. The tube 4 is provided with the elbow 7 into which the diametrically reduced end of the tube 8 snugly fits and is provided with a groove similar to 6 to receive the set screw 9 threaded in the elbow. The tube 8 is provided with the elbow 10 fixed thereon and swiveled to a complementary elbow 11 having the tube 12 fixed therein. The socket 13 snugly fits the tube 12 and is provided with a set screw 14 engaging an annular groove therein similar to 6. The socket 13 terminates in the elbow 15.

All of these socket and set screw points may be swiveled, assembled or disassembled and reassembled in interchangeable relations, as will be hereinafter more fully described.

The shaft of the motor terminates in a socket-chuck to receive the suitably shaped end of the shaft 16. The opposite end of this shaft is provided with a journal 17 rotating in a bearing 18 mounted within the elbow 7 see Fig. 4. The bevel gear 19 is fixed on the end of the shaft 16 and enmeshes with the similar gear 21 fixed on the end of the shaft 22 that is journaled at 23 in the end of the tube 8.

The opposite end of the shaft 22 is similarly journaled in a bearing held in the end of the tube 8 by the set screw 24. The miter gear 26 is fixed on the end of the shaft 22 and enmeshes with the similar gear 27 fixed on a sleeve journaled upon the cross pin 28. This pin is fixed in the elbow 11 and extends through the elbow 10, which are drawn together by the nut 29 threaded on the pin 28. The miter gear 31 is fixed on the opposite end of the sleeve and revolves integrally with the gear 27. The miter gear 32 enmeshes with the gear 31 and is fixed on the end of the shaft 33 that is journaled within the bearing 34 fixed within the tube 12. This shaft terminates in a chuck 36 adapted to receive the bit shank 37 of the saw 38, as in Fig. 1.

A further plane of action may be obtained by the swivel elbow 13–15, Fig. 3, in which the properly shaped shaft 39 is adapted to engage the chuck 36. The opposite end of this shaft is suitably journaled in the bearing 41 in the tube 13. The bevel gear 42 is fixed on the end of the shaft 39 and enmeshes with a similar gear 43 fixed on the chuck 44 journaled in the socket bearing 46, that is fixed in the elbow 15, within which it bottoms. The ring bearing 47 slips over the chuck 44 and bears against the back of the gear 43 and is held in position by the annular nut 48 threaded in the end of the elbow 15 and removable by a spanner key engageable in slots 49 therein. The saw 38 or other tool can be held in this chuck.

The chuck and shank herein disclosed will be made the subject of a separate application for patent.

The chuck comprises a tubular member 51, see Fig. 5 having a transverse pin 52 set across the socket 53. This chuck is attached to its driving shaft by the cross pin 54. The opposite end of the chuck is provided with an external annular groove, to receive the encircling wire retainer 56. This groove is provided with a slot at 57, into which the straight portion 58 of the retainer extends across and within the socket 53.

The shank 59 forms a slip fit with the socket 53 and is milled away at the end 61 to pass the transverse pin 52, to prevent its rotation within the socket, and to insure its retention within the chuck during its operation. It is provided with a lateral notch 62 into which the pin 52 enters when power is applied, preventing the dislodgment of the shank. The shank is also provided with a shallow recess 63 into which the retainer 58 resiliently engages to detachably lock the shank within the chuck. The shank is readily removable by manually rotating it until the recess 63 disengages from the resilient tension of the retainer 56; also disengaging the notch 62 from the pin 52, permitting the easy removal of the shank. The end of the shank is rounded at 64 to wedge the retainer open, unless the shank is inserted with the flat portion 61 over the straight portion 58, when the retainer will then be spread by the camlike wall 66 of the flattened portion. This interchangeable scope of shank is formed on all tools adapted for use in connection with the universal shaft provided with this form of chuck.

This chuck and shaft construction is also applied throughout the various sections of the universal shaft, whereby the working tools may be inserted within the plug 3 in direct connection with the motor or into the elbows 7—11 or 15. It is obvious that innumerable tube sections of various lengths or modifications, may be substituted for those shown or combined therewith, in meeting particular circumstances of difficult accessibility.

When used in connection with bone surgery the operator grasps the tube 8, permitting the motor 1 to hang suspended pendulum fashion, which gives the operator splendid control over the instrument which is thus held in normal equilibrium. By obvious manipulation of the swivels at the elbows 10—11 and 13—15, universal planes of action including complete reverse direction parallel with the motor shaft or any degree of angle thereto may be obtained. The importance of this is manifest considering that the working tools are operating within the incision where it is highly desirable at times, because of the peculiar angles of bone fracture, the direction of which can not always be approximated before the incision is made. With this invention, holes may be bored into or through the bone at proper angles for the application of bolts, screw plates or other fixtures.

For the manipulation of the shaft manually, I provide an extension of the shaft 22 in the elbow 7 see Fig. 4 the end of which is flattened, as at 61 in the shanks described, except that the notch 62 and the gap 63 are omitted. The manual handle 67 of any suitable shape is provided with a socket 68, provided with a cross pin 69 adapted to engage the end 71 of the shaft 22, for manual rotation of the combination of shafts intervening between the handle 67 and the terminal tool. This is particularly useful in driving screws into joining plates or in applying threaded bone pegs and other uses that otherwise would necessitate enlarging the incision rearranging forceps or risking the disalinement of the bone ends, by attempts to operate at uncomfortable angles.

For simplicity plain bearings are illustrated at the various journals but where high speed and efficiency are desiderata antifriction bearings are recommended.

Miter gears have been shown at the elbows to conform to the angle of 90 degrees, but bevel gears to conform to any desired angles may be substituted.

Having thus described this invention, what I claim and desire to secure by Letters Patent is:—

1. An extension shaft and housing therefor an electric motor, comprising in combination, a shaft section having its one end rigidly connected to the one end of the motor shaft, a hollow plug extended from the casing of the motor, within which the shaft section connecting means is freely revoluble, a tubular member telescoping said shaft section and its one end telescoping the plug formed on the casing of the motor, a set screw threaded through the tubular member adjacent its end telescoping said plug, and said plug having an annular groove into which said set screw extends, whereby the tubular member is rotatably held.

2. In a device of the class described, a plurality of shaft sections, disposed at right angles to one another, and having their adjacent ends rotatably connected, an elbow for housing each pair of the adjacent ends of the shafts, a pipe section telescoping each of the shafts and having one of its ends rigidly connected to the adjacent elbow, and its other end sliding within the adjacent elbow and having an annular groove formed in its portion within the elbow, and a set screw threaded through each elbow and its inner end adapted to extend within the groove formed in the end of said pipe sections, whereby the one end of said pipe sections is rotatably held.

In testimony whereof, I have hereunto set my hand at San Francisco, California, this 8th day of November, 1919.

WILLIAM L. BELL.

In the presence of—
LINCOLN V. JOHNSON.